Dec. 15, 1964　　　　　　　　S. PURE　　　　　　　　3,161,831
ACOUSTICAL NOISE PULSE SIMULATOR
Filed Dec. 22, 1961　　　　　　　　　　　　　　　　　2 Sheets-Sheet 1
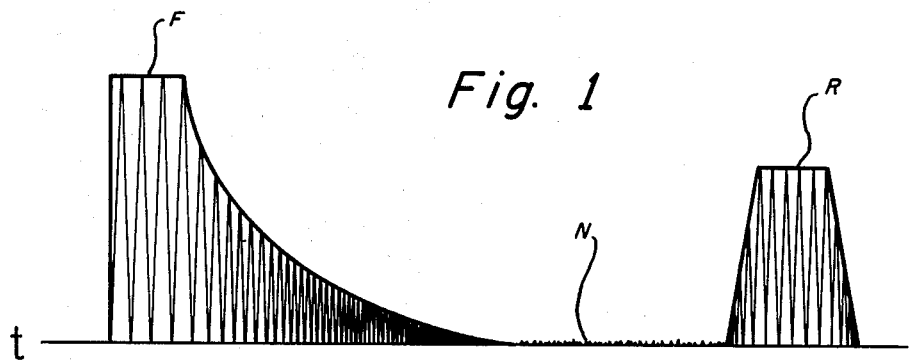
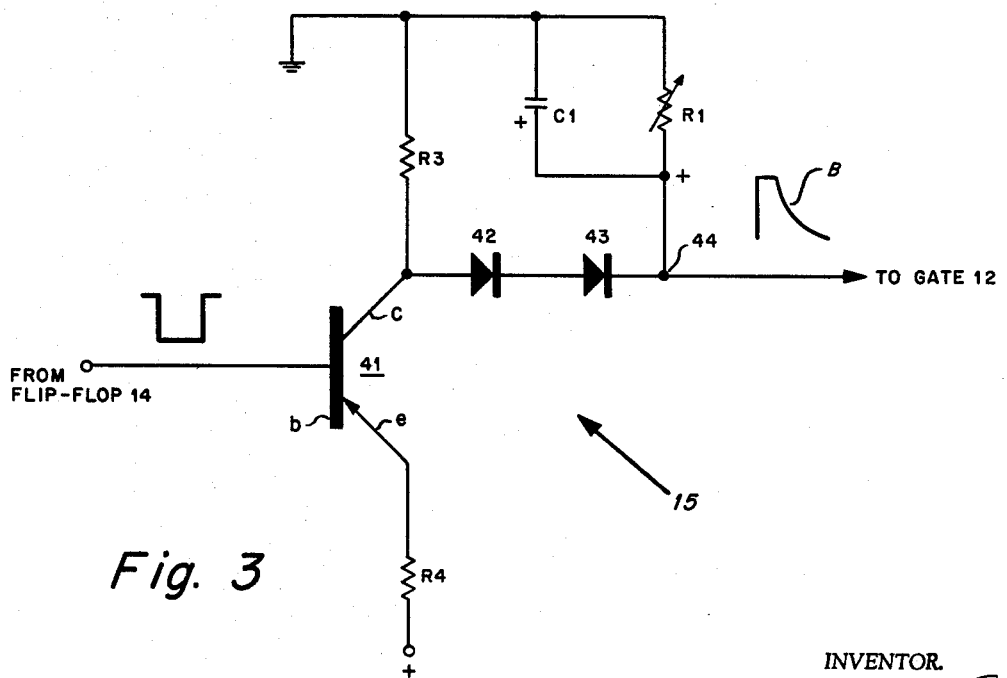
INVENTOR.
SAMUEL PURE
BY
ATTORNEY

United States Patent Office 3,161,831
Patented Dec. 15, 1964

3,161,831
ACOUSTICAL NOISE PULSE SIMULATOR
Samuel Pure, Rydal, Pa., assignor to the United States of America as represented by the Secretary of the Navy
Filed Dec. 22, 1961, Ser. No. 161,749
7 Claims. (Cl. 328—67)
(Granted under Title 35, U.S. Code (1952), sec. 266)

The invention herein described may be manufactured and used by or for the Government of the United States of America for governmental purposes without the payment of any royalties thereon or therefor.

This invention relates to a signal simulator and more particularly to a circuit for simulating signals representative of an exploded charge in the return echo from a target for use in testing and calibrating echo ranging equipment.

Present day echo ranging equipment measures range and determine position of a water submerged target by exploding a charge near an inwater receiver. By comparison of the time relationships between an explosion and the echo of the explosion from a target, accurate location of the target can be computed. Sonobuoys in the water convert the acoustical pulses received to electrical signals and transmit them to the echo ranging equipment.

Simultaneously with the development of the sophisticated echo ranging equipment in use today there naturally arose the need for the accurate testing and calibration thereof. In the beginning, actual inwater testing was performed by setting up actual echo ranging situations. However, such a system of testing serves only to ascertain the operability of the equipment used and in no way tests the accuracy of the equipment or its reliability.

Alternately, tape recordings of actual blast and echo acoustical pulses were played back into the echo ranging equipment. The only advantage of the tape recordings over the previously mentioned method was the capability of moving the testing to a convenient laboratory location.

Aside from the inconveniences of the old methods of testing, laboratory test conditions were impossible to achieve. Therefore, it became apparent that the acoustical pulses associated with explosive echo ranging should be simulated in the form of electrical signals to be completely controllable in order to achieve laboratory test conditions.

The circuit of the present invention generates a sharp rising, slow decaying noise signal representing a direct blast and after an adjustable time delay generates a noise signal representative of the return echo from a target. The decay time, pulse width, pulse height and the noise background may be adjusted to any desired level to electrically simulate the actual blast and blast echo for any desired range condition. The circuit of the present invention may be automatically recycled to provide a constantly repeated output of blast and echo signals. Since the repetition rate is completely controllable, it is possible to determine whether varying results are caused by the echo ranging equipment.

Therefore it is an object of the present invention to provide a signal simulator which generates a signal representative of a blast and a time related signal representative of the echo of the blast.

It is another object of the present invention to provide a fast rising, slow decaying blast representative noise signal which may be controlled according to amplitude and decay time, and a blast echo representative noise signal which may be controlled according to duration, amplitude and time of occurrence with respect to the blast representative signal.

A further object of the present invention is to provide a circuit to electrically simulate the blast and blast echo in which a noise frequency is modulated in a first channel by a first pulse representative of the form of a direct blast acoustical pulse and in which the noise frequency is modulated in a second channel by a second pulse representative of the form of a blast echo acoustical pulse wherein the time of occurrence of the second pulse is variable with respect to the first pulse.

Yet another object of the present invention is to provide a signal simulator circuit which serves to duplicate actual echo blast ranging situations and which provide controllable electrical signals representative of blast, blast echo and sea noise for the accurate testing and calibration of echo ranging equipment.

Other objects and features of the invention will become apparent to those skilled in the art as the disclosure is made in the following detailed description of a preferred embodiment of the invention as illustrated in the accompanying sheet of drawing in which:

FIG. 1 illustrates the wave form of the acoustical pulses created by a blast and a blast echo which are electrically simulated in the present invention.

FIG. 3 illustrates in schematic form the exponential pulse former of FIG. 1.

Figure 2:
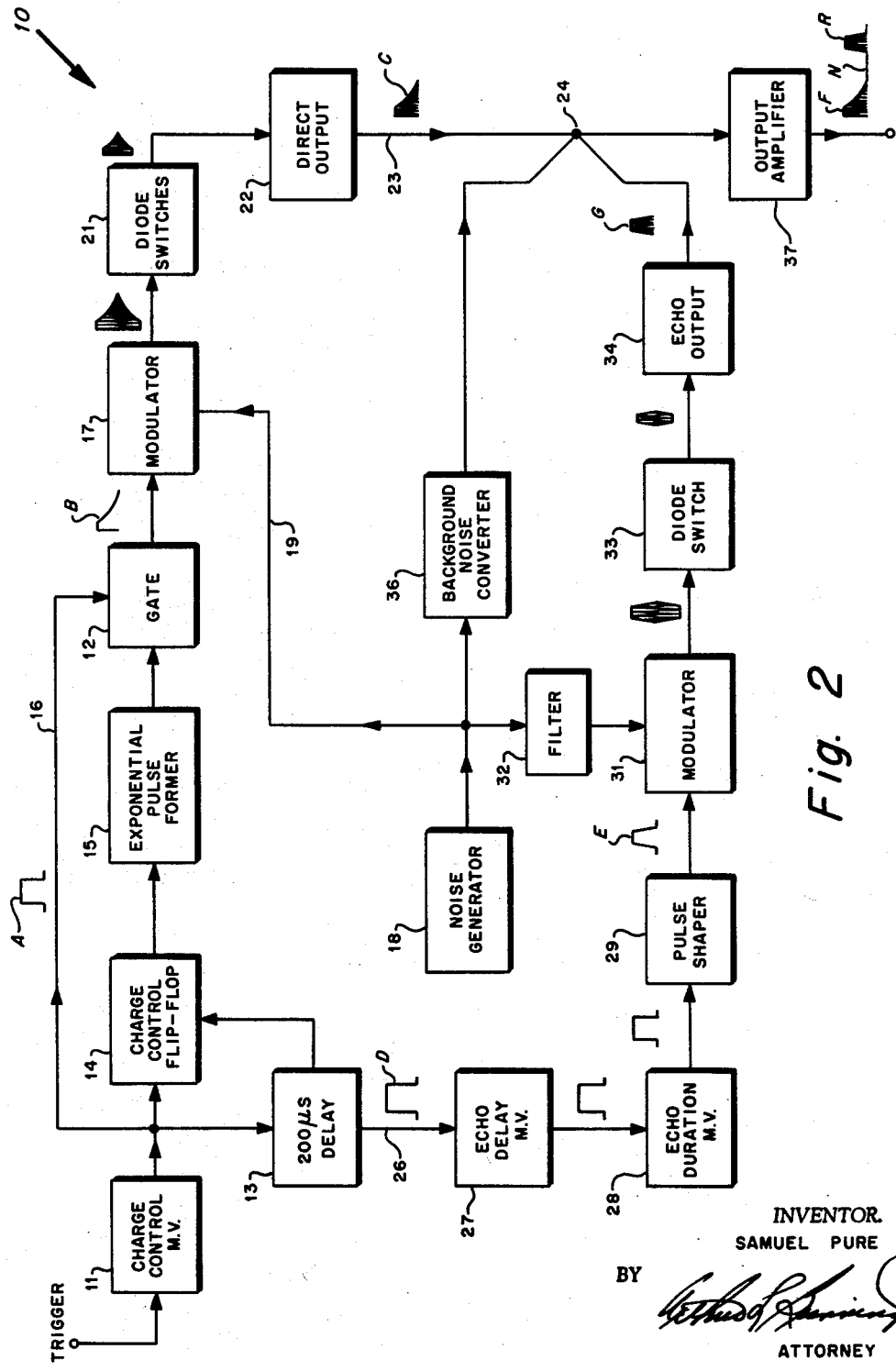
FIG. 2 is a block diagram illustrating the preferred embodiment of the present invention.

When a charge is exploded on the water in the vicinity of a submerged target, an acoustical pulse is generated by the direct blast. Such an acoustical pulse has the waveform shown in FIG. 1 at F and is made up of a wide band noise frequency which maintains a peak amplitude for a short time and which slowly attenuates to a point where it becomes undiscernable from the normal noise frequency N characteristic of the sea within a specified area.

In blast echo range equipment, a receiver located near the blast picks up the acoustical pulse and converts it to an electrical pulse for use in the range computer.

When the acoustical pulse is reflected from an object such as a target, it has the waveform shown in FIG. 1 at R. However, the frequency components which made up waveform R are different from those which made up waveform F due to normal attenuation caused by the sea and distance the wave travels. Obviously the distance of the target from the receiver is related to the time displacement of pulse or waveform R with respect to pulse or waveform F.

The circuit of the present invention contemplates the electrical simulation of the above described acoustical pulses wherein all the parameters including the random noise of the sea are generated in a controlled manner.

Referring to FIG. 2, there is shown a charge control multivibrator 11 which generates pulse A to initiate a complete cycle of operation of the present invention. Charge control multivibrator 11 may be triggered once for a single cycle of operation or it may be automatically triggered as by a constantly repeating pulse so that the system continuously recycles. The output pulse A of charge control multivibrator 11 is fed to normally open gate 12 and functions to close gate 12 throughout the duration of pulse A. Pulse A of charge control multivibrator 11 is also directly fed to charge control flip flop circuit 14. On the receipt of pulse A, the conductive state of flip-flop 14 is changed and causes a condenser in exponential pulse former 15, more fully described hereinbelow, to be charged. The time it takes the condenser in exponential pulse former 15 to charge is well within the time duration of pulse A. Pulse A from charge control multivibrator 11 is fed to charge control flip flop 14 through a 200 microsecond delay circuit 13. The delayed pulse from delay circuit 13 functions to maintain charge control flip flop 14 in its conductive state caused by pulse A for 200 microseconds after the termination of pulse A. Charge control flip flop 14 thus acts to hold the charge on the condenser in exponential pulse former at its fully charged state for 200 microseconds after gate 12 is opened on the termination of pulse A. Therefore, gate 12 which is reopened on the termination of pulse A, passes an exponentially decayed pulse B having a form shown at the output of gate 12 in FIG. 2.

The exponentially decayed pulse B from gate 12 is fed to amplitude modulator 17 where it functions to amplitude modulate a wide band noise frequency generated in noise generator 18 and fed to amplitude modulator 17 via line 19.

The output from modulator 17 is, therefore, a pulse of wide frequency components conforming in amplitude to the shape of pulse B. The output from modulator 17 is fed directly to diode switch 21. Diode switch 21 functions to remove from the modulated noise frequency the random noise introduced by the inherent characteristics of the circuit. The output from diode switch box 21 is fed to a mixing junction 24 through output amplifier 22 and conductor 23. The signal thus appearing on conductor 23 is an envelope C of wide band noise frequency which simulates electrically the acoustical pulse F shown in FIG. 1 generated by a direct blast.

The pulse from delay circuit 13 is fed to echo delay multivibrator 27 via conductor 26 where its time of occurrence with respect to the signal on conductor 23 may be varied as desired. Alternately, delay multivibrator may be replaced with a delay line having means for varying the time delay thereof. The echo pulse is then fed to echo duration multivibrator 28 where its width is changed to simulate the width of an actual echo pulse. The pulse is fed to pulse shaper 29 where its rise time and drop time is lengthened so that the pulse conforms to the shape of an actual blast echo from a target. The pulse E from pulse shaper 29 is fed directly to modulator 31 where it functions to amplitude modulate the wide band noise frequency from noise generator 18. The noise generator 18 has its output connected to modulator 31 through filter 32. Filter 32 is interposed between noise generator 18 and modulator 31 to filter the noise frequency in accordance with the known modification of the noise frequency that actually takes place when the blast echo travels from a target back to a receiver. Modulator 31 provides an output pulse of noise frequency conforming in amplitude to the shape of the output pulse from pulse shaper 29. The output from modulator 31 is fed to output amplifier 34 after having the random noise removed in diode switch 33. Output amplifier 34, therefore, provides a pulse G of wide band frequency which is modulated according to the known shape of an echo pulse. The output of amplifier 34 is also fed to mixing junction 24.

There is a background noise converter 36 connected to noise generator 18 for converting the noise frequency output to a frequency and amplitude which simulates the actual background noise associated with the sea which would normally be picked up during an actual echo ranging operation. This controlled noise signal is also fed to mixing junction 24. The signal appearing at mixing junction 24 is fed to an amplifier 37. The output of amplifier 37 is, therefore, a signal pair for each trigger pulse input at charge control multivibrator 11 and which represents the direct blast and the blast echo from a target and including the background noise normally associated therewith.

The exponential pulse former 15 comprises a transistor 41, the base of which is connected to the output of charge control flip flop 14. Resistor $R_3$ is connected between ground and the collector of transistor 41. Forward conducting diodes 42 and 43 are connected between the collector of transistor 41 and ground through parallely connected capacitor $C_1$ and variable resistor $R_1$, as shown in FIG. 3. A positive power source is connected to ground through resistor $R_4$, transistor 41 and resistor $R_3$. Terminal 44 is connected to gate 12. The base of transistor 41 is connected to charge control flip flop circuit 14.

When the conductive state of flip flop circuit 14 is changed from its normal state by pulse A, a negative pulse is applied at the base of transistor 41 thereby causing transistor 41 to conduct. The duration of the negative pulse is sufficient to cause capacitors $C_1$ to become fully charged by the positive source through resistor $R_4$, the emitter-collector circuit of transistor 41, and diodes 42, 43. As foresaid, by virtue of the time delayed pulse applied to the base of transistor 41, transistor 41 is maintained conductive for 200 microseconds after gate 12 is opened. This maintains the charge on condenser $C_1$ for the 200 microsecond period. When transistor 41 becomes non-conductive, capacitor $C_1$ discharges through variable resistor $R_1$ which provides a pulse B shown at the output of gate 12 of the form shown. The decay time of this charge of capacitor $C_1$ may be varied by varying the time constant of the RC circuit by varying the resistance $R_1$.

All of the pulse forming and modifying circuits used in this invention are of a conventional nature and each is equipped with variable circuit components for changing the various circuit parameters therein for effectively controlling pulse widths and amplitudes, and in the case of the simulated echo pulse, the time of occurrence with respect to the simulated blast pulse.

When the circuit of the present invention is used as in testing and/or calibrating echo ranging equipment, the output of amplifier 37 is fed directly to the input of the equipments tested. In the case of testing sonobuoys which is a receiver for converting via transducers the acoustical pulses to electrical pulses and transmitting the electrical pulses to the computer of the echo range equipment, the simulated pulses of this invention are inserted into the sonobuoy after the transducer elements.

Obviously, many modifications and variations of the present invention are possible in the light of the above teachings. It is, therefore, to be understood, that within the scope of the appended claims, the invention may be practiced otherwise than as specifically described.

What is claimed is:

1. A circuit for generating electrical noise pulses simulating the acoustical noise pulses generated by the direct blast and the blast echo from a target used in blast echo ranging equipment, comprising in combination:
   first means generating an exponentially decayed pulse,
   noise frequency generating means,
   first modulating means connected to said first means and said noise frequency generating means modulating the noise frequency according to said exponentially decayed pulse,
   second means connected to said modulating means for removing random noise components from said modulated pulse,
   third means providing a square wave,
   delay means connected to said third means for varying the time of occurrence of said square wave with respect to the occurrence of said exponentially decayed pulse,
   second modulating means connected to said noise frequency generating means and said delay means modulating said noise frequency according to said square wave, background noise generating means providing an output representing the characteristic noises of the sea, junction means, fourth means connecting said first and second modulating means to said junction means, fifth means connecting said background noise generating means to said junction means, output terminal means connected to said junction means whereby said output terminal means provides an output comprising a first noise pulse representative of the direct blast and a second pulse representative of the blast echo from a target and background noise representing the characteristic noises of the sea.

2. A circuit according to claim 1, wherein said first means for generating an exponentially decayed pulse comprises, multivibrator means providing an output pulse, normally open gate means coupled to said multivibrator means closed by said output pulse, charge control means, pulse former means connected between said charge control means and said gate means, said pulse former means including a charging condenser, circuit means connecting said multivibrator means to said charge control means for charging said condenser within the duration of said output pulse, delay means connected to said charge control means and said multivibrator means for maintaining the charge on said condenser for a predetermined time after said output pulse has terminated and said gate means has reopened.

3. A circuit for generating electrical noise pulses simulating the acoustical noise pulses generated by a direct blast and the blast echo from a target used in blast echo ranging equipment, comprising in combination:

first means generating an exponentially decayed pulse having the shape of an acoustical noise pulse, noise frequency generating means generating a first wide band frequency having the frequency characteristics of an acoustical noise pulse, first modulating means connected to said first means and said noise frequency generating means modulating said first wide band frequency in accordance with said exponentially decayed pulse, second means providing a pulse having the shape of an acoustical noise pulse echo, said second means including delay means for varying the time of occurrence of said pulse provided by said second means with respect to said exponentially decayed pulse, third means connected to said noise frequency generating means providing a second wide band frequency having the frequency characteristics of an acoustical noise pulse echo, second modulating means connected to said second and third means modulating said second wide band frequency in accordance with said pulse provided by said second means, output terminal means connected to said first and second modulating means providing said modulated first wide band frequency pulse and said modulated second wide band frequency pulse as a pulse pair output.

4. A circuit according to claim 3, wherein said first means comprises, multivibrator means providing an output pulse, normally open gate means coupled to said multivibrator means closed by said output pulse, charge control means, pulse former means connected between said charge control means and said gate means, said pulse former means including a charging condenser, circuit means connecting said multivibrator means to said charge control means for charging said condenser within the duration of said output pulse, delay means connected to said charge control means and said multivibrator means for maintaining the charge on said condenser for a predetermined time after said output pulse has terminated and said gate means has reopened.

5. A circuit for generating electrical noise pulses simulating the acoustical noise pulses generated by a direct blast and the blast echo from a target used in blast echo ranging equipment, comprising, in combination:

first means generating an exponentially decayed pulse having the shape of an acoustical noise pulse, noise frequency generating means generating a first wide band frequency having the frequency characteristics of an acoustical noise pulse, first modulating means connected to said first means and said noise frequency generating means modulating said first wide band frequency in accordance with said exponentially decayed pulse, first diode means connected to said first modulating means for removing random noise components from said first wide band frequency modulated pulse, second means providing a pulse having the shape of an acoustical noise pulse echo, said second means including delay means for varying the time of occurrence of said pulse with respect to said exponentially decayed pulse, third means connected to said noise frequency generating means providing a second wide band frequency having the frequency characteristics of an acoustical noise pulse echo, second modulating means connected to said second and third means modulating said second wide band frequency in accordance with said pulse, second diode means connected to said second modulating means for removing random noise components from said second wide band frequency modulated pulse, background noise generating means providing an output representing background sea noise, output terminal means connected to first and second diode means and to said background noise generating means whereby said output terminal means provides an output pulse pair representative of the acoustical noise pulse generated by a direct blast and an acoustical noise pulse echo generated by the blast echo from a target and the background sea noise normally associated therewith.

6. A circuit according to claim 5, wherein said first means comprises, multivibrator means providing an output pulse, normally open gate means coupled to said multivibrator means closed by said output pulse, charge control means, pulse former means connected between said charge control means and said gate means, said pulse former means including a charging condenser, circuit means connecting said multivibrator means to said charge control means for charging said condenser within the duration of said output pulse, delay means connected to said charge control means and said multivibrator means for maintaining the charge on said condenser for a predetermined time after said output pulse has terminated and said gate means has reopened.

7. A circuit for generating electrical noise pulses simulating acoustical noise pulses generated by a direct blast and the blast echo from a target used in blast echo ranging equipment, comprising in combination:

first means generating an exponentially decayed pulse having the shape of an acoustical noise pulse, noise frequency generating means for generating a wide band frequency having the frequency characteristics of an acoustical noise pulse, modulating means connected to said first means and said noise frequency generating means modulating said wide band frequency in accordance with said exponentially decayed pulse, second means providing a noise pulse, said second means including third means for varying the time of occurrence of said noise pulse with respect to said exponentially decayed pulse, output means connected to said modulating means and said second means providing said modulated wide band frequency pulse and said noise pulse as a pulse pair output.

References Cited by the Examiner
UNITED STATES PATENTS 3,048,785  8/62  Cartier _____ 328—58

ARTHUR GAUSS, *Primary Examiner.*